United States Patent
Hou et al.

(10) Patent No.: US 10,297,943 B2
(45) Date of Patent: May 21, 2019

(54) ELECTRICAL RECEPTACLE CONNECTOR WITH PLURALITY OF INSULATING PORTIONS STRUCTURALLY SEPARATED FROM EACH OTHER

(71) Applicant: Advanced Connectek Inc., New Taipei (TW)

(72) Inventors: Pin-Yuan Hou, New Taipei (TW); Yu-Lun Tsai, New Taipei (TW); Long-Fei Chen, New Taipei (TW); Kang Qin Li, New Taipei (TW); Hsu-Fen Wang, New Taipei (TW); Chien-Tsung Chuang, New Taipei (TW); Cheng-Yan Wu, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 0 days.

(21) Appl. No.: 15/970,868

(22) Filed: May 3, 2018

(65) Prior Publication Data

US 2018/0323530 A1 Nov. 8, 2018

(30) Foreign Application Priority Data

May 5, 2017 (CN) .......................... 2017 1 0310385

(51) Int. Cl.
| | |
|---|---|
| *H01R 13/648* | (2006.01) |
| *H01R 13/424* | (2006.01) |
| *H01R 13/6581* | (2011.01) |
| *H01R 13/506* | (2006.01) |
| *B29C 45/00* | (2006.01) |
| *H01R 13/405* | (2006.01) |
| *H01R 13/504* | (2006.01) |
| *H01R 43/24* | (2006.01) |

(Continued)

(52) U.S. Cl.
CPC ........... *H01R 13/424* (2013.01); *B29C 45/00* (2013.01); *H01R 13/405* (2013.01); *H01R 13/504* (2013.01); *H01R 13/506* (2013.01); *H01R 13/6581* (2013.01); *H01R 43/24* (2013.01); *H01R 13/6585* (2013.01); *H01R 24/60* (2013.01)

(58) Field of Classification Search
CPC .............. H01R 23/688; H01R 23/6873; H01R 13/65802; H01R 13/658; H01R 23/7073
USPC ............ 439/607.08, 607.09, 607.13, 607.27, 439/607.35, 607.45, 607.55, 660
See application file for complete search history.

(56) References Cited

U.S. PATENT DOCUMENTS

| | | | | |
|---|---|---|---|---|
| 8,968,031 B2 * | 3/2015 | Simmel | ................ | H01R 13/659 439/660 |
| 9,022,800 B2 * | 5/2015 | Yang | .................. | H01R 13/6581 439/487 |

(Continued)

*Primary Examiner* — Thanh Tam T Le
(74) *Attorney, Agent, or Firm* — JCIPRNET

(57) ABSTRACT

An electrical receptacle connector includes a plurality of first terminals, a plurality of second terminals, a first insulator, a second insulator, a shielding plate and a third insulator. The first insulator includes a first front insulating portion and a first rear insulating portion. The first front insulating portion covers a part of each of the first terminals. The second rear insulating portion covers another part of each of the first terminals. The second insulator partially covers each of the second terminals. The third insulator partially covers each of the first terminals, the second terminals, the first insulator, the second insulator and the shielding plate.

7 Claims, 5 Drawing Sheets

(51) Int. Cl.
*H01R 13/6585* (2011.01)
*H01R 24/60* (2011.01)

(56) References Cited

U.S. PATENT DOCUMENTS

| | | | |
|---|---|---|---|
| 9,178,319 B2 * | 11/2015 | Little | H01R 13/6585 |
| 9,252,542 B2 * | 2/2016 | Little | H01R 13/6585 |
| 9,281,626 B2 * | 3/2016 | Lin | H01R 13/6581 |
| 9,728,899 B2 * | 8/2017 | Peng | H01R 13/6581 |
| 9,735,511 B2 * | 8/2017 | Kao | H01R 13/5202 |
| 9,843,141 B2 * | 12/2017 | Peng | H01R 13/6581 |
| 9,871,327 B2 * | 1/2018 | Simmel | H01R 13/659 |
| 9,912,086 B2 * | 3/2018 | Guo | H01R 12/716 |
| 9,923,286 B2 * | 3/2018 | Cheng | H01R 13/405 |
| 2010/0291798 A1 * | 11/2010 | Kondo | H01R 25/00 439/607.08 |

* cited by examiner

ELECTRICAL RECEPTACLE CONNECTOR WITH PLURALITY OF INSULATING PORTIONS STRUCTURALLY SEPARATED FROM EACH OTHER

CROSS-REFERENCE TO RELATED APPLICATION

This application claims the priority benefit of China patent application serial no. 201710310385.5, filed on May 5, 2017. The entirety of the above-mentioned patent application is hereby incorporated by reference herein and made a part of the specification.

BACKGROUND

Field of the Disclosure

The disclosure is related to an electrical connector, and particularly to an electrical receptacle connector.

Description of Related Art

Electrical connector is a component commonly used for electronic devices, and can be connected with matching electrical connector of other electronic devices to serve as a signal and power transmitting medium. Known electrical connector includes, for example, universal serial bus (USB) electrical connector. Currently, a new TYPE-C electrical connector specification is introduced to USB protocol, which not only allows data transmission with 10 Gbps of ultra-high speed rate, and the insertion port of receptacle is symmetrical and thus allowing reversible connection, such electrical connector is widely applied in various electronic devices such as notebook computer.

Since the number of component for USB TYPE-C electrical receptacle connector is large and the size thereof is small, generally an insulator is formed first through injection molding to partially cover a terminal. However, in the process of forming the insulator through injection molding to cover the whole line of terminals, short shot (i.e., a mold cavity is not completely filled by molding material) might be occurred; as a result, the cost and the number of defective product are increased.

SUMMARY

The disclosure provides an electrical receptacle connector configured to be disposed in an electronic device to be connected with a matching electrical plug connector.

In the disclosure, an electrical receptacle connector includes a plurality of first terminals, a plurality of second terminals, a first insulator, a second insulator, a shielding plate and a third insulator. Each of the first terminals has a first contact segment, a first soldering segment and a first extending segment. The first extending segment is connected to the corresponding first contact segment and the corresponding first soldering segment, and each of the first contact segments has a first contact region. Each of the second terminals has a second contact segment, a second soldering segment and a second extending segment. The second extending segment is connected to the corresponding second contact segment and the corresponding second soldering segment, and each of the second contact segments has a second contact region. The first insulator includes a first front insulating portion and a first rear insulating portion. The first front insulating portion and the first rear insulating portion are structurally separated from each other. The first front insulating portion covers each of the first contact segments and a portion of each of the first extending segments in adjacency to the corresponding first contact segment and exposes each of the first contact regions. The first rear insulating portion covers a portion of each of the first extending segments in adjacency to the corresponding first soldering segment. The second insulator partially covers each of the second terminals and exposes each of the second contact regions and each of the second soldering segments. The shielding plate is disposed between the first insulator and the second insulator. The third insulator partially covers the first extending segment of each of the first terminals, the second extending segment of each of the second terminals, the first insulator, the second insulator and the shielding plate, and exposes each of the first contact regions and each of the second contact regions.

In an embodiment of the disclosure, a first gap is located between the first front insulating portion and the first rear insulating portion. The first terminals are extended through the first gap, and the third insulator is extended into the first gap.

In an embodiment of the disclosure, the second insulator includes a second front insulating portion and a second rear insulating portion. The second front insulating portion and the second insulating portion are structurally separated from each other. The second front insulating portion covers each of the second contact segments and a portion of each of the second extending segments in adjacency to the corresponding second contact segment and exposes each of the second contact regions, and the second rear insulating portion covers a portion of each of the second extending segments in adjacency to the corresponding second soldering segment.

In an embodiment of the disclosure, a second gap is located between the second front insulating portion and the second rear insulating portion. The second terminals are extended through the second gap, and the third insulator is extended into the second gap.

In an embodiment of the disclosure, the shielding plate has a pair of shielding contact regions. The pair of shielding contact regions is disposed at two opposite side edges of the shielding plate, and the third insulator exposes each of the shielding contact regions.

In an embodiment of the disclosure, the electrical receptacle connector further includes a shielding shell which encloses the first insulator, the second insulator and the third insulator.

In an embodiment of the disclosure, the electrical receptacle connector is compliant with USB TYPE-C standard.

Based on the above, in the disclosure, by dividing the insulator that partially covers each of the terminals into a plurality of portions, and the portions are formed by injecting material via a plurality of gates, the occurrence of short shot may be reduced in the process of forming the insulator.

In order to make the aforementioned features and advantages of the disclosure more comprehensible, embodiments accompanying figures are described in detail below.

DESCRIPTION OF EMBODIMENTS

Figure 1A:
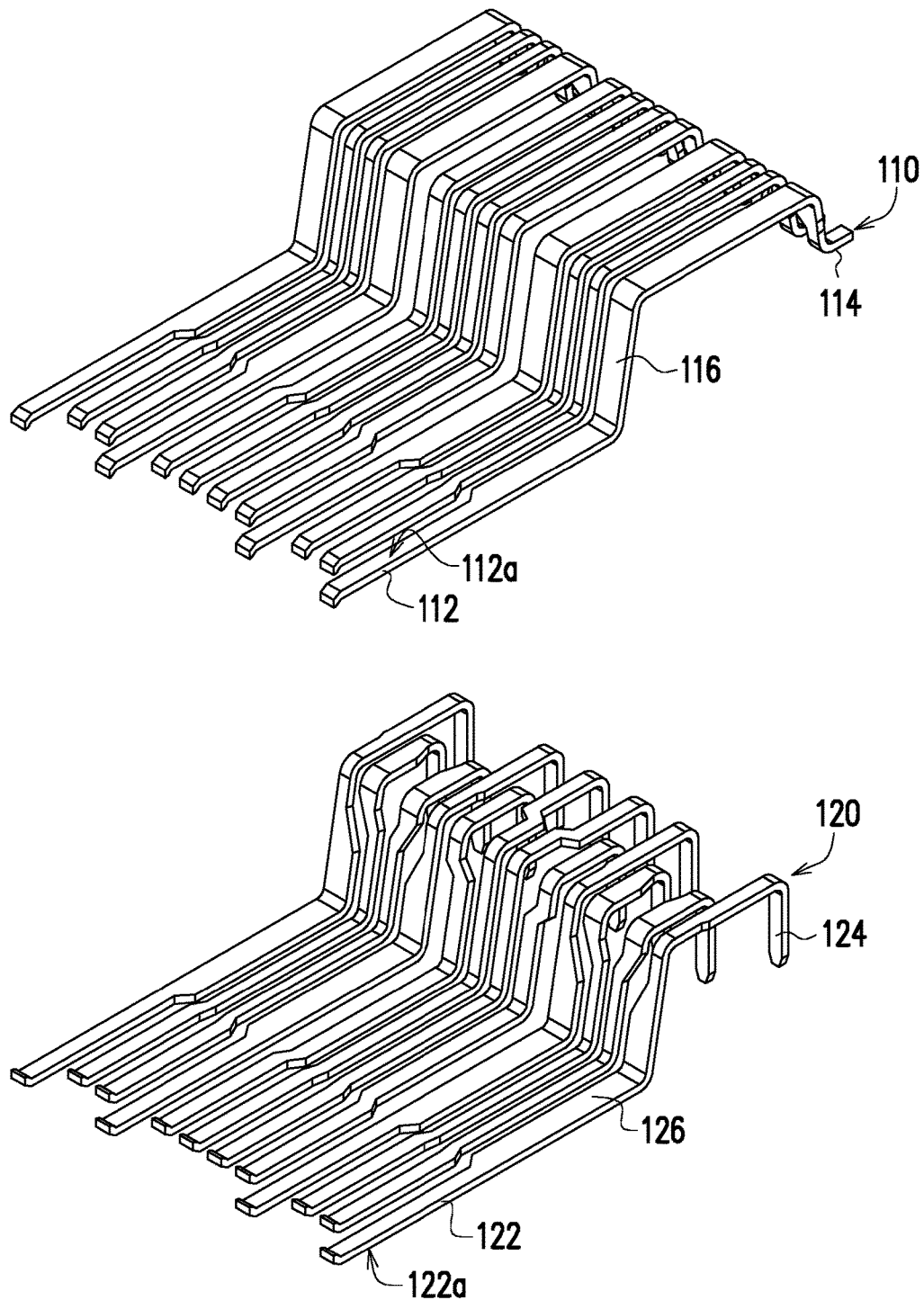
FIG. 1A through FIG. 1E illustrate a manufacturing process of an electrical receptacle connector according to an embodiment of the disclosure.
Figure 1B:
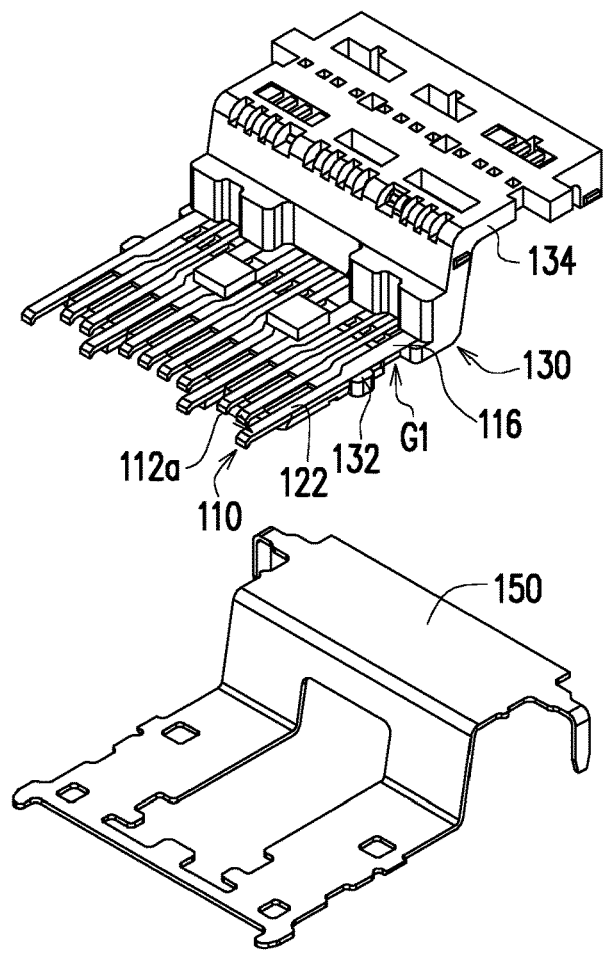
Figure 1B:
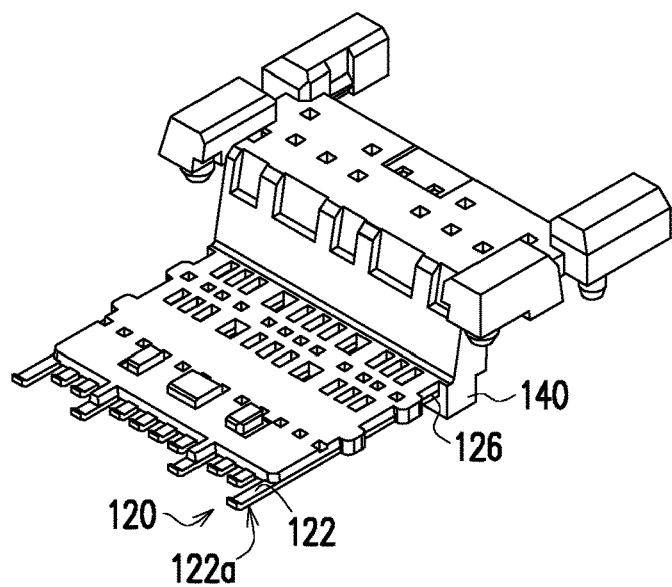
Figure 1C:
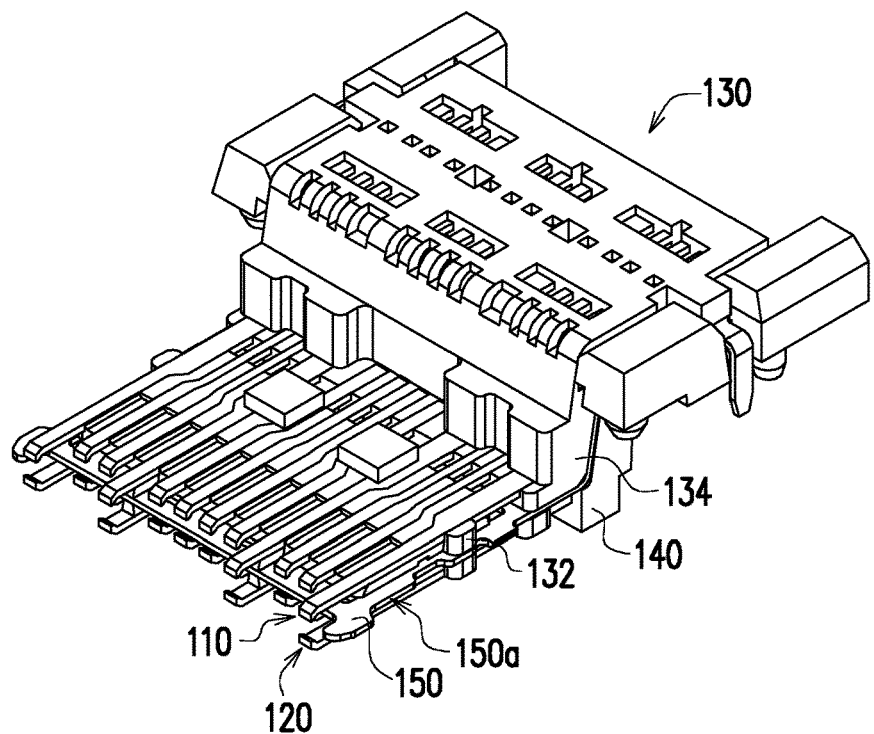
Figure 1D:
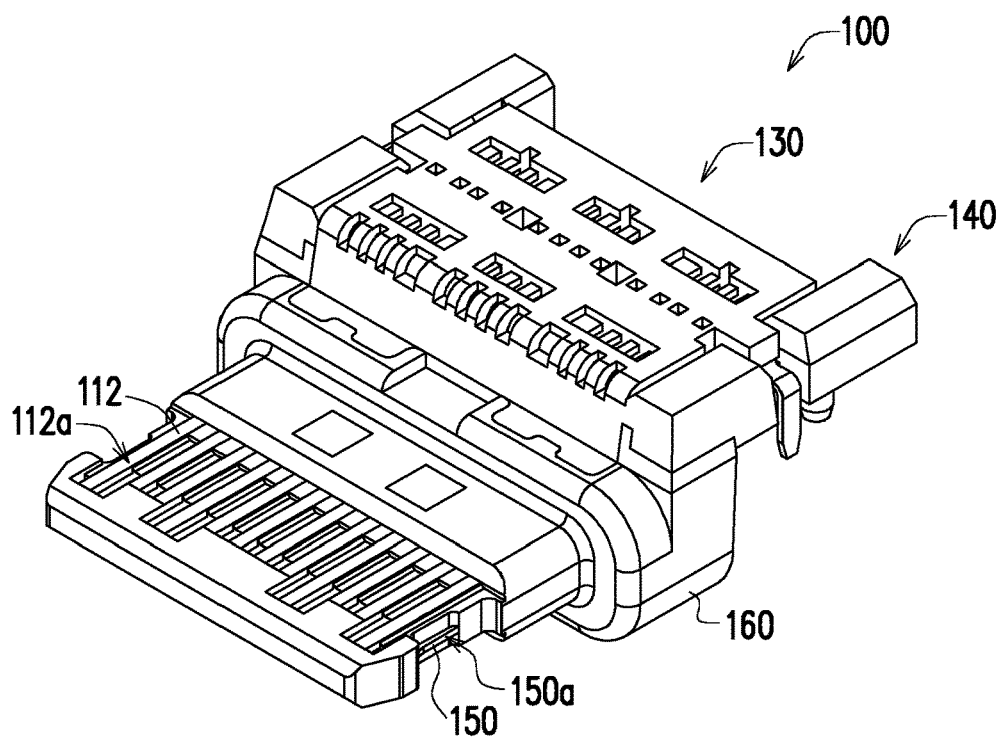
Figure 1E:
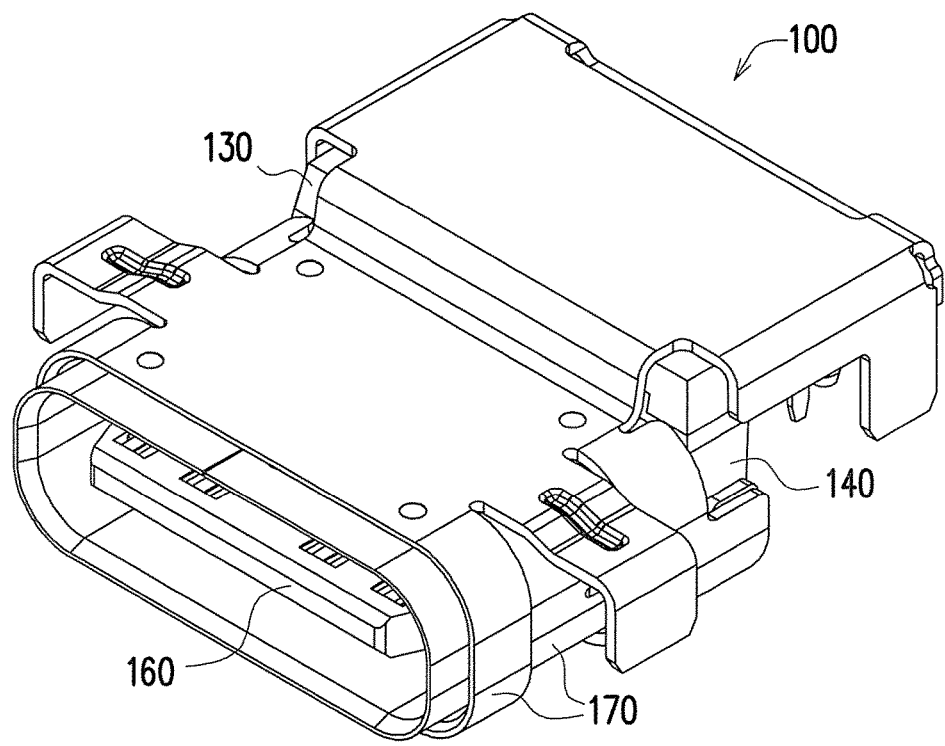

In the embodiment, FIG. 1 through FIG. 1E are provided to show a manufacturing process of an electrical receptacle connector 100 (as shown in FIG. 1C or FIG. 1D) of the embodiment.

Referring to FIG. 1A, the electrical receptacle connector 100 includes a plurality of first terminals 110 and a plurality of second terminals 120. Each of the first terminals 110 has a first contact segment 112, a first soldering segment 114 and a first extending segment 116. The first extending segment 116 is connected to the corresponding first contact segment 112 and the corresponding first soldering segment 114, and each of the first contact segment 112 has a first contact region 112a. Each of the second terminals 120 has a second contact segment 122, a second soldering segment 124 and a second extending segment 126. The second extending segment 126 is connected to the corresponding second contact segment 122 and the corresponding second soldering segment 124, and each of the second contact segment 122 has a second contact region 122a.

Referring to FIG. 1B, the electrical receptacle connector 100 further includes a first insulator 130 and a second insulator 140. The first insulator 130 partially covers each of the first terminals 110 and exposes each of the first contact regions 112a and each of the first soldering segment 114. The second insulator 140 partially covers each of the second terminals 120 and exposes each of the second contact regions 122a and each of second soldering segments 124. In the embodiment, the first insulator 130 and the second insulator 140 may be formed through injection molding.

In order to avoid occurrence of short shot (i.e., the mold cavity is not completely filled with molding material) in the process of forming the first insulator 130 through injection molding, the first insulator 130 may be divided into a plurality of portions, and the portions are formed by injecting material via a plurality of gates. In the embodiment, the first insulator 130 includes a first front insulating portion 132 and a first rear insulating portion 134. The first front insulating portion 132 and the first rear insulating portion 134 are structurally separated from each other. The first front insulating portion 132 covers a portion of each of the first terminals 110. The second rear insulating portion 134 covers another portion of each of the first terminals 110. Specifically, the first front insulating portion 132 covers each of the first contact segments 112 and a portion of the first extending segments 116 in adjacency to the corresponding first contact segment 112 and exposes each of the first contact regions 112a. The first rear insulating portion 134 covers a portion of each of the first extending segments 116 in adjacency to the corresponding first soldering segment 114.

Referring to FIG. 1C, the electrical receptacle connector 100 further includes a shielding plate 150 (e.g., as shown in FIG. 1B) disposed between the first insulator 130 and the second insulator 140. After the first insulator 130 and the second insulator 140 are formed, the first terminals 110 formed with the first insulator 130 (including the first front insulating portion 132 and the first rear insulating portion 134), the second terminals 120 formed with the second insulator 140 and the shielding plate 150 are combined together. In the embodiment, the above-mentioned components may be assembled through concave-convex matching and pin-hole matching.

Figure 2:
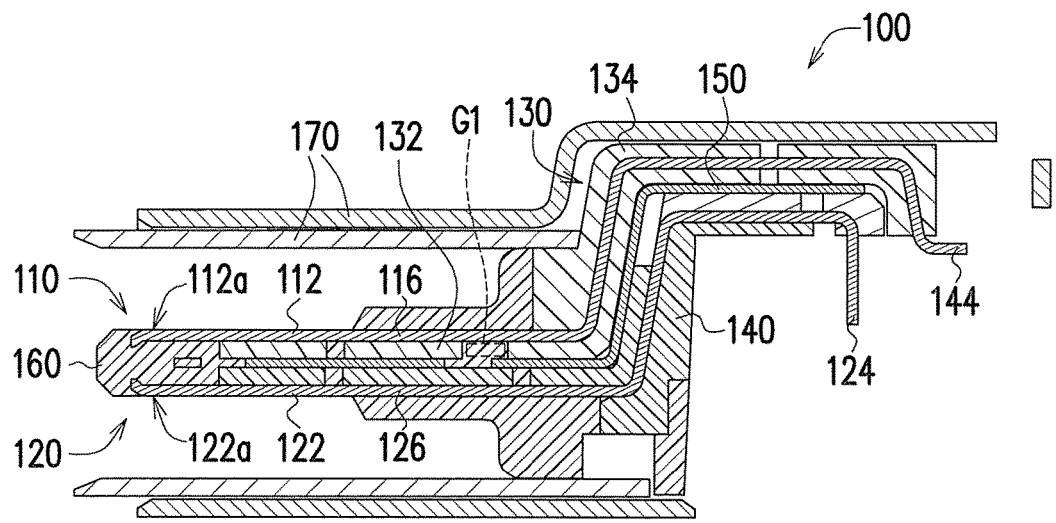
FIG. 2 is a sectional view of the electrical receptacle connector in FIG. 1E.

Referring to FIG. 1D and FIG. 2, the electrical receptacle connector 100 further includes a third insulator 160. The third insulator 160 partially covers each of the first terminals 110, each of the second terminals 120, the first insulator 130, the second insulator 140 and the shielding plate 150, and exposes each of the first contact regions 112a and each of the second contact regions 122a. In the embodiment, the third insulator 160 may be formed through injection molding. A first gap G1 is located between the first front insulating portion 132 and the first rear insulating portion 134. The first terminals 110 are extended through the first gap G1, and the third insulator 160 is extended into the first gap G1. A second gap G2 is located between the second front insulating portion and the second rear insulating portion. The second terminals 120 are extended through the second gap G2, and the third insulator 160 is extended into the second gap G2. In the embodiment, the shielding plate 150 has a pair of shielding contact regions 150a. The pair of shielding contact regions 150a is disposed at two opposite side edges of the shielding plate 150, and the third insulator 160 exposes each of the shielding contact regions 150a.

Referring to FIG. 1E and FIG. 2, the electrical receptacle connector 100 may further include a shielding shell 170 which encloses the first insulator 130, the second insulator 140 and the third insulator 160. In the embodiment, the electrical receptacle connector 100 may be compliant with USB TYPE-C standard, but the disclosure provides no limitation thereto.

Figure 3:
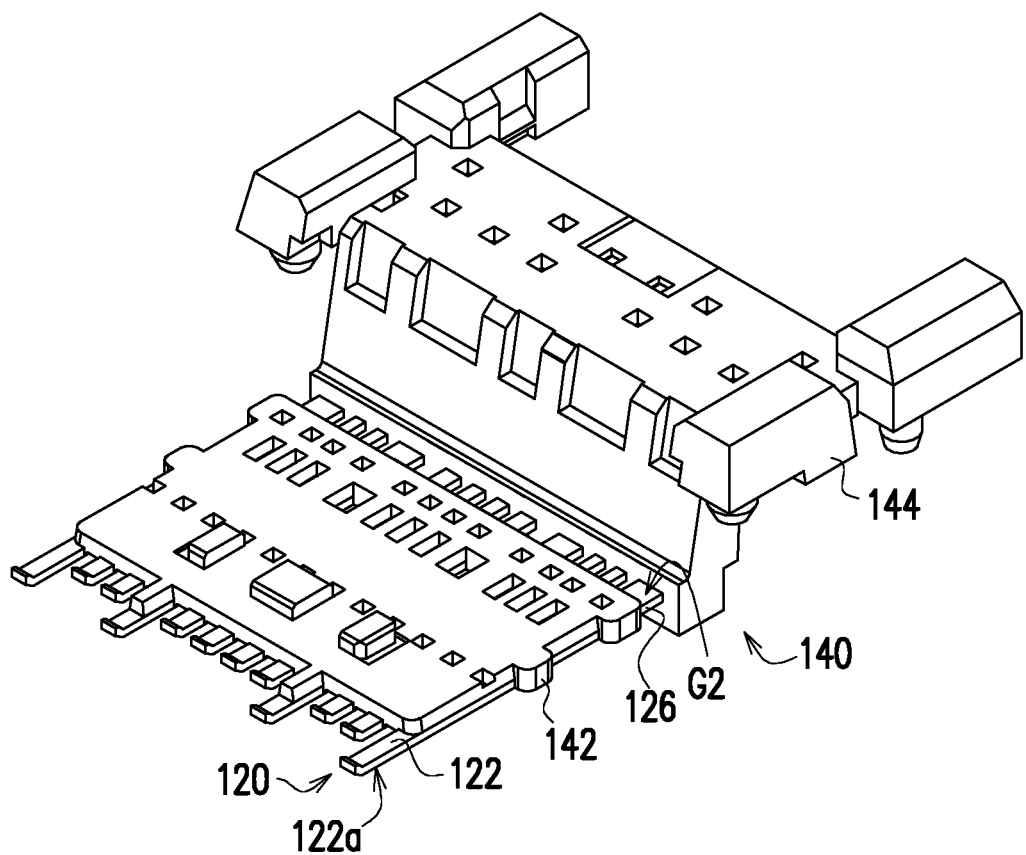
FIG. 3 illustrates a second terminal and a second insulator of an electrical receptacle connector according to another embodiment of the disclosure.

Referring to FIG. 1B, in the embodiment, only the first insulator 160 is divided into a plurality of portions, e.g., a first front insulating portion 132 and a first rear insulating portion 134, and the second insulator 140 is not divided into a plurality of portions but a single component. However, in another embodiment, to avoid the occurrence of short shot (i.e., the mold cavity is not completely filled with molding material) in the process of forming the second insulator 140 through injection molding, the second insulator 140 may also be divided into a plurality of portions, and the portions are formed by injecting material via a plurality of gates. Specifically, as shown in FIG. 3, the second insulator 140 may include a second front insulating portion 142 and a second rear insulating portion 144. The second front insulating portion 142 and the second rear insulating portion 144 are structurally separated from each other. The second front insulating portion 142 covers each of the second contact segments 122 and a portion of each of the second extending segments 126 in adjacency to the corresponding second contact segment 122 (as shown in FIG. 1A) and exposes each of the second contact regions 122a. The second rear insulating portion 144 covers a portion of each of the second extending segments 126 in adjacency to the corresponding second soldering segment 124 (as shown in FIG. 1A). In addition, in another embodiment that is not shown, the first insulator may not be divided into a plurality of portions but a single component, and the second insulator may be divided into a plurality of portions to partially cover each of the second terminals.

In summary, according to the disclosure, by dividing the insulator that partially covers each of the terminals into a plurality of portions, and the portions are formed by injecting material via a plurality of gates, the occurrence of short shot may be reduced in the process of forming the insulator.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. An electrical receptacle connector, comprising:
a plurality of first terminals, each of the first terminals having a first contact segment, a first soldering segment and a first extending segment, wherein the first extending segment is connected to the corresponding first contact segment and the corresponding first soldering segment, and each of the first contact segments has a first contact region;
a plurality of second terminals, each of the second terminals has a second contact segment, a second soldering segment and a second extending segment, wherein the second extending segment is connected to the corresponding second contact segment and the corresponding second soldering segment, and each of the second contact segments has a second contact region;
a first insulator comprising a first front insulating portion and a first rear insulating portion, wherein the first front insulating portion and the first rear insulating portion are structurally separated from each other, the first front insulating portion covers each of the first contact segments and a portion of each of the first extending segments in adjacency to the corresponding first contact segment and exposes each of the first contact region, and the first rear insulating portion covers a portion of each of the first extending segments in adjacency to the corresponding first soldering segment;
a second insulator partially covering each of the second terminals and exposing each of the second contact regions and each of the second soldering segments;
a shielding plate disposed between the first insulator and the second insulator; and
a third insulator partially covering each of the first terminals, each of the second terminals, the first insulator, the second insulator and the shielding plate, and exposing each of the first contact regions and each of the second contact regions.

2. The electrical receptacle connector according to claim 1, wherein a first gap is located between the first front insulating portion and the first rear insulating portion, the first terminals are extended through the first gap, and the third insulator is extended into the first gap.

3. The electrical receptacle connector according to claim 1, wherein the second insulator comprises a second front insulating portion and a second rear insulating portion, the second front insulating portion and the second rear insulating portion are structurally separated from each other, the second front insulating portion covers each of the second contact segments and a portion of each of the second extending segments in adjacency to the corresponding second contact segment and exposes each of the second contact regions, and the second rear insulating portion covers a portion of each of the second extending segments in adjacency to the corresponding second soldering segment.

4. The electrical receptacle connector according to claim 3, wherein a second gap is located between the second front insulating portion and the second rear insulating portion, the second terminals are extended through the second gap, and the third insulator is extended into the second gap.

5. The electrical receptacle connector according to claim 1, wherein the shielding plate has a pair of shielding contact regions, the pair of shielding contact regions is disposed at two opposite side edges of the shielding plate, and the third insulator exposes each of the shielding contact regions.

6. The electrical receptacle connector according to claim 1, further comprising:
a shielding shell enclosing the first insulator, the second insulator and the third insulator.

7. The electrical receptacle connector according to claim 1, wherein the electrical receptacle connector is compliant with USB TYPE-C standard.

* * * * *